(12) United States Patent
Fukuda

(10) Patent No.: US 7,079,689 B2
(45) Date of Patent: Jul. 18, 2006

(54) IMAGE PROCESSING APPARATUS AND ITS METHOD, AND PROGRAM

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/176,031

(22) Filed: Jun. 21, 2002

(65) Prior Publication Data
US 2003/0081678 A1 May 1, 2003

(30) Foreign Application Priority Data
Jun. 25, 2001 (JP) .............................. 2001-191851

(51) Int. Cl.
*G06K 9/46* (2006.01)
*G06K 9/66* (2006.01)

(52) U.S. Cl. .............. 382/191; 375/240.03; 375/240.2; 382/100; 382/209; 382/150; 382/151; 713/176

(58) Field of Classification Search .................. 348/27; 375/240.03, 240.2; 382/100, 191, 250, 251; 713/176
See application file for complete search history.

(56) References Cited

U.S. PATENT DOCUMENTS

| | | | | |
|---|---|---|---|---|
| 5,461,421 A * | 10/1995 | Moon | ..................... | 375/240.13 |
| 5,489,944 A * | 2/1996 | Jo | .......................... | 375/240.03 |
| 5,530,478 A * | 6/1996 | Sasaki et al. | .......... | 375/240.04 |
| 5,543,844 A * | 8/1996 | Mita et al. | ............... | 375/240.2 |
| 5,724,452 A * | 3/1998 | Ohara | ........................ | 382/251 |
| 5,793,893 A * | 8/1998 | Kim | ............................ | 382/242 |
| 5,793,898 A * | 8/1998 | Nakamoto | .................. | 382/250 |
| 5,821,929 A | 10/1998 | Shimizu et al. | ............. | 345/338 |
| 5,926,225 A * | 7/1999 | Fukuhara et al. | ........ | 348/416.1 |
| 5,953,460 A * | 9/1999 | Wu | ............................ | 382/232 |
| 6,038,345 A * | 3/2000 | Osawa et al. | ............... | 382/232 |
| 6,049,634 A * | 4/2000 | Abe | ............................ | 382/250 |
| 6,072,834 A * | 6/2000 | Kim et al. | ................... | 375/240 |
| 6,091,856 A * | 7/2000 | Terane et al. | ............... | 382/246 |
| 6,341,350 B1* | 1/2002 | Miyahara et al. | ........... | 713/176 |
| 6,348,945 B1* | 2/2002 | Hayakawa | ............. | 375/240.18 |
| 6,389,072 B1* | 5/2002 | Tzou et al. | .................. | 375/240 |
| 6,445,870 B1* | 9/2002 | Abe | ............................ | 386/33 |
| 6,498,816 B1* | 12/2002 | Easwar et al. | ......... | 375/240.26 |
| 6,519,289 B1* | 2/2003 | Bruck | .................... | 375/240.27 |

(Continued)

FOREIGN PATENT DOCUMENTS

JP        8-140097        5/1996

(Continued)

OTHER PUBLICATIONS

Leszek Cieplinski, et al., "Visual Working Draft 4.0," ISO/IEC JTC1/SC29/WG11/W3522, Beijing (Jul. 2000).

(Continued)

*Primary Examiner*—Kanjibhai Patel
*Assistant Examiner*—Gregory Desire
(74) *Attorney, Agent, or Firm*—Fitzpatrick, Cella, Harper & Scinto

(57) ABSTRACT

An initial similarity candidate calculator calculates a similarity between first and second images, which are expressed by quantized DCT coefficients, on the basis of at least first and second image feature amounts of the first and second images. A coefficient conversion processor executes a coefficient conversion process for at least one of the first and second image feature amounts. Based on an image feature amount obtained by that process, a similarity calculator calculates a similarity between the first and second images. Then, a final similarity between the first and second images is determined from the calculated similarities.

11 Claims, 15 Drawing Sheets

U.S. PATENT DOCUMENTS

| | | | |
|---|---|---|---|
| 6,532,541 B1 * | 3/2003 | Chang et al. | 713/176 |
| 6,556,624 B1 * | 4/2003 | Orchard et al. | 375/240.12 |
| 6,556,625 B1 * | 4/2003 | Haskell et al. | 375/240.2 |
| 6,577,766 B1 * | 6/2003 | Standridge | 382/236 |
| 6,600,837 B1 * | 7/2003 | Shimura et al. | 382/239 |
| 6,606,039 B1 * | 8/2003 | Hirano et al. | 341/65 |
| 6,668,021 B1 * | 12/2003 | Shimizu et al. | 375/240.2 |
| 6,718,299 B1 * | 4/2004 | Kondo et al. | 704/224 |
| 6,721,438 B1 * | 4/2004 | Iwamura et al. | 382/100 |
| 6,753,908 B1 * | 6/2004 | Nakamura et al. | 348/223.1 |
| 6,771,393 B1 * | 8/2004 | Honary | 358/409 |
| 6,823,074 B1 * | 11/2004 | Sugaya et al. | 382/100 |
| 6,834,344 B1 * | 12/2004 | Aggarwal et al. | 713/176 |
| 6,879,703 B1 * | 4/2005 | Lin et al. | 382/100 |

FOREIGN PATENT DOCUMENTS

| | | |
|---|---|---|
| JP | 8-204957 | 8/1996 |
| JP | 2000-134459 | 5/2000 |
| JP | 2001-084333 | 3/2001 |
| WO | WO 01/41071 | 6/2001 |

OTHER PUBLICATIONS

Sylvie Jeannin, et al.,"MPEG-7 Visual part of eXperimentation Model Version 7.0," ISO/IEC JTC1/SC29/WG11/N3521, Beijing (Jul. 2000).

Kasutani, Eiji et al., "Image Retrieval System Using Compact Color Layout Descriptor", Image Media Processing Symposium, Sep. 27, 1999-Sep. 29, 1999, Proceedings of the 4th Image Media Processing Symposium, Japan, Sep. 27, 1999, pp. 89, 90.

Yamada, Akio et al., "A Super High Image Retrieval System From An Image", Image Lab, vol. 11, No. 6, Japan, Japan Industrial Publishing Co., Ltd., Jun. 1, 2000, pp. 31-34.

* cited by examiner

ORIGINAL IMAGE

HORIZONTAL MIRROR

COUNTERCLOCKWISE
90° ROTATION

COUNTERCLOCKWISE
90° ROTATION – HORIZONTAL MIRROR

180° ROTATION

180° ROTATION
– HORIZONTAL MIRROR

CLOCKWISE 90° ROTATION

CLOCKWISE 90° ROTATION
– HORIZONTAL MIRROR

COUNTERCLOCKWISE 90° ROTATION - VERTICAL MIRROR CONVERSION

VERTICAL MIRROR CONVERSION

HORIZONTAL MIRROR CONVERSION

10101

IMAGE PROCESSING APPARATUS AND ITS METHOD, AND PROGRAM

FIELD OF THE INVENTION

The present invention relates to an image processing apparatus for calculating a similarity between images and its method, and a program.

BACKGROUND OF THE INVENTION

In one conventional method, an image is scaled, and the generated scaled image undergoes a known discrete cosine transform (DCT) process and quantization process. Some DCT coefficients are extracted from the low-frequency component side of DCT coefficients obtained by the quantization result, and are set as an image feature amount of an original image, which are used in image search (ISO/IEC JTC1/SC29/WG11/W3522 "MPEG-7 Visual Working Draft 4.0" (to be referred to as [VWD4.0] hereinafter) or ISO/IEC JTC1/SC29/WG11/N3521 "MPEG-7 Visual part of eXperimentation Model Version 7.0" (to be referred to as [VXM7.0] hereinafter)).

An image feature amount extraction process in [Color Layout Descriptor] described in [VWD4.0] or [VXM7.0] will be described below using FIGS. 11 to 15.

FIG. 11 is a view for explaining an image feature amount extraction process in [Color Layout Descriptor] described in [VWD4.0] or [VXM7.0]. FIG. 12 is a flow chart showing that image feature amount extraction process.

An image scaling process for scaling an original image 10001 to 8×8 pixels for respective R, G, and B color components is executed (step S10401). A color conversion process for converting pixels of generated 8×8 pixel images 10011, 10012, and 10013 for respective color components into color component data 10021, 10022, and 10023 on a YCbCr color space is executed (step S10402).

The color component data 10021, 10022, and 10023 on the YCbCr color space undergo a DCT process to acquire DCT coefficients 10031, 10032, and 10033 for respective color components (step S10403).

Note that the image scaling process, color conversion process, and DCT process can be known ones.

The DCT coefficients 10031, 10032, and 10033 undergo a quantization process (step S10404).

According to, e.g., [VWD4.0], the quantization process can be implemented by processes described by program codes 10000 to 10003 below. The program codes 10000 to 10003 are described using known C language.

According to [VWD4.0], since different quantization processes are executed for DC and AC components for each of Y and Cb/Cr components, the program codes 10000 to 10003 that implement four different processes are prepared.

Program code 10000: Quantization process for DC component of Y coefficient

```
Int quant_Y_DC(int i){
    Int j;
    i=i/8;
    if(i>192) j=112+(i-192)/4;
    else if(i>160) j=96+(i-160)/2;
    else if(i>96) j=32+i-96;
    else if(i>64) j=16+(i-64)/2;
    else j=i/4;
    return j>>1;
}
```

Program code 10001: Quantization process for DC component of Cb/Cr coefficient

```
Int quant_CbCr_DC(int i){
    int j;
    i=i/8;
    if(i>191) j=63;
    else if(i>160) j=56+(i-160)/4;
    else if(i>144) j=48+(i-144)/2;
    else if(i>112) j=16+i-112;
    else if(i>96) j=8+(i-96)/2;
    else if(i>64) j=(i-64)/4;
    else j=i/0;
    return j;
}
```

Program code 10002: Quantization process for AC component of Y coefficient

```
Int quant_Y_AC(int i){
    int j;
    i=i/2;
    if(i>255) i=255;
    if(i<-256) i=-256;
    if(abs(i)>127) j=64+abs(i)/4;
    else if(abs(i)>63) j=32+abs(i)/2;
    else j=abs(i);
    j=(i<0)?-j:j;
    return(int)trunc(((double)j+128.0)/8.0+0.5);
}
```

Program code 10003: Quantization process for AC component of Cb/Cr coefficient

```
Int quant_CbCr_AC(int i){
    int j;
    if(i>255) i=255;
    if(i<-256) i=-256;
    if(abs(i)>127) j=64+abs(i)/4;
    else if(abs(i)>63) j=32+abs(i)/2;
    else j=abs(i);
    j=(i<0)?-j:j;
    return(int)trunc(((double) j+128.0)/8.0+0.5);
}
```

As a result of the quantization processes described by the program codes 10000 and 10001, the DCT coefficient of the Y or Cb/Cr component that has undergone quantization (to be referred to as quantized DCT coefficients hereinafter) assumes a value ranging from 0 to 63. On the other hand, as a result of the quantization processes described by the program codes 10002 and 10003, the quantized DCT coefficient of the Y or Cb/Cr component assumes a value ranging from 0 to 31. Hence, the DC component of the Y or Cb/Cr component can be expressed by 6 bits (unsigned), and the AC component can be expressed by 5 bits (unsigned).

A coefficient select process for selecting some coefficients from the low-frequency component side of quantized DCT coefficients 10041, 10042, and 10043 obtained as a result of the quantization processes is executed (step S10405).

In case of FIG. 11, six quantized DCT coefficients of the Y component, and three each quantized DCT coefficients of the Cb/Cr components are selected. In practice, the coefficient select process is implemented by linearly rearranging quantized DCT coefficients, which are arranged in an 8×8 two-dimensional matrix by a zigzag scan process shown in FIG. 13, and selecting some coefficients from the head of the rearranged coefficients. Reference numeral 10101 in FIG. 13 denotes a chart indicating the zigzag scan, and a numerical value from 1 to 64 described in each of 8×8 blocks indicates the order of position of that quantized DCT coefficient from the head after the coefficients are linearly rearranged.

Some quantized DCT coefficients are acquired from the low-frequency component side of the obtained DCT quantized coefficients. According to [VWD4.0], the number of quantized DCT coefficients to be acquired is one of 1, 3, 6, 10, 15, 21, 28, and 64. The numbers of quantized DCT coefficients of the Cb and Cr components are equal to each other, but the numbers of quantized DCT coefficients of the Y and Cb/Cr components can be independently set.

As a default, six quantized DCT coefficients of the Y component, and three each quantized DCT coefficients of the Cb/Cr components are selected. In FIG. 11, default coefficient selection is made, i.e., six quantized DCT coefficients (10051) of the Y component, and three each quantized DCT coefficients (10052, 10053) of the Cb/Cr components are selected.

The selected quantized DCT coefficients 10051, 10052, and 10053 are defined as an image feature amount, i.e., Color Layout descriptor of the original image 10001.

According to [VWD4.0], this Color Layout descriptor is stored in a binary structure, as shown in FIG. 14 or 15. In a structure 10201 in FIG. 14 or 10301 in FIG. 15, each block expresses one bit. In the structure 10201 or 10301, a flag and coefficients are partitioned in units of fields for the sake of convenience. However, in practice, these flag and coefficients are continuously stored in the order indicated by the broken arrows in FIG. 14 or 15.

FIG. 14 shows the binary structure when Color Layout descriptor is a default, i.e., when six quantized DCT coefficients of the Y component, and three each quantized DCT coefficients of the Cb/Cr components are selected. In this case, "0" is stored in an expansion flag at the head of the structure. Following the flag, six quantized DCT coefficients of the Y component, three quantized DCT coefficients of the Cb component, and three quantized DCT coefficients of the Cr component are stored in turn. Since the DC component of a quantized DCT coefficient can be expressed by 6 bits (unsigned) and the AC component can be expressed by 5 bits (unsigned), each DC component is stored in a 6-bit field, and each AC component is stored in a 5-bit field.

On the other hand, FIG. 15 shows the binary structure when Color Layout descriptor is not a default. In this case, "1" is stored in an expansion flag at the head of the structure. Two 3-bit fields follow the flag. These 3-bit fields are coefficient designation fields used to indicate the numbers of quantized DCT coefficients of the Y and Cb/Cr components. For example, the following table shows correspondence between bit patterns indicating such numbers and the numbers of quantized DCT coefficients.

| Bit pattern | Number of quantized DCT coefficients |
| --- | --- |
| 000 | 1 |
| 001 | 3 |
| 010 | 6 |
| 011 | 10 |
| 100 | 15 |
| 101 | 21 |
| 110 | 28 |
| 111 | 64 |

Furthermore, after these two 3-bit coefficient designation fields, quantized DCT coefficients are stored in the order of Y, Cb, and Cr components. The numbers of coefficients of Y, Cb, and Cr components are designated by the coefficient designation fields. In the structure 10301 in FIG. 15, for example, six quantized DCT coefficients of the Y component and six each quantized DCT coefficients of the Cb/Cr component are stored.

According to [VXM7.0], a similarity between images based on the quantized DCT coefficients selected as the image feature amount is calculated by a similarity calculation formula below. For example, similarity D between two Color Layout descriptors CLD1 (YCoeff, CbCoeff, CrCoeff) and CLD2 (YCoeff', CbCoeff', CrCoeff') is computed by:

$$D = \sqrt{\sum_{i=0}^{Max\{NumberOfYCoeff\}-1} \lambda_{Yi}(YCoeff[i] - Ycoeff'[i])^2} +$$
$$\sqrt{\sum_{i=0}^{Max\{NumberOfCCoeff\}-1} \lambda_{Cbi}(CbCoeff[i] - Cbcoeff'[i])^2} +$$
$$\sqrt{\sum_{i=0}^{Max\{NumberOfCCoeff\}-1} \lambda_{Cri}(CrCoeff[i] - Crcoeff'[i])^2}$$

where $\lambda$ is a weighting value for each quantized DCT coefficient, and [VXM7.0] shows the following weighting value table. Note that the weighting value in a blank of the table is 1. Also, weighting values for those which are not shown in this table (the order is 7 or later) are 1.

| | Order of coefficients | | | | | |
| --- | --- | --- | --- | --- | --- | --- |
| | 1 | 2 | 3 | 4 | 5 | 6 |
| Y | 2 | 2 | 2 | 1 | 1 | 1 |
| Cb | 2 | 1 | 1 | | | |
| Cr | 4 | 2 | 2 | | | |

When two Color Layout descriptors have different numbers of quantized DCT coefficients, the similarity calculation formula is applied in correspondence with fewer quantized DCT coefficients, or deficient quantized DCT coefficients are complemented with values "16", and the similarity calculation formula is applied in correspondence with more quantized DCT coefficients.

However, the image similarity calculation formula according to [VMX7.0] alone cannot identify images which have undergone one or both of:

image rotation mirror conversion of image.

A person can easily recognize that a given image and another image are similar to each other although they are reversed in the horizontal direction, or are similar to each other if one of them is rotated 90°. However, the similarity calculation formula of Color Layout descriptors described in [VXM7.0] cannot make such recognition.

SUMMARY OF THE INVENTION

The present invention has been made to solve the aforementioned problems, and has as its object to provide an image processing apparatus which can determine, as similar images, images which become similar to each other if they are rotated or mirror-converted but cannot be determined as similar images by the conventional method, its method, and a program.

It is an object of a present invention to provide an image processing apparatus for calculating a similarity between images, comprising: first calculation means for calculating a similarity between first and second images, which are expressed by quantized DCT coefficients, on the basis of at least first and second image feature amounts of the first and second images; coefficient conversion means for executing a coefficient conversion process for at least one of the first and second image feature amounts; second calculation means for calculating a similarity between the first and second images on the basis of an image feature amount obtained by the coefficient conversion means; and determination means for determining a similarity between the first and second images from the similarities calculated by the first and second calculation means.

It is another object of the present invention to provide an image processing method for calculating a similarity between images, comprising: the first calculation step of calculating a similarity between first and second images, which are expressed by quantized DCT coefficients, on the basis of at least first and second image feature amounts of the first and second images; the coefficient conversion step of executing a coefficient conversion process for at least one of the first and second image feature amounts; the second calculation step of calculating a similarity between the first and second images on the basis of an image feature amount obtained in the coefficient conversion step; and the determination step of determining a similarity between the first and second images from the similarities calculated in the first and second calculation steps.

It is still another object of the present invention to provide a program for making a computer function as an image process for calculating a similarity between images, comprising: a program code of the first calculation step of calculating a similarity between first and second images, which are expressed by quantized DCT coefficients, on the basis of at least first and second image feature amounts of the first and second images; a program code of the coefficient conversion step of executing a coefficient conversion process for at least one of the first and second image feature amounts; a program code of the second calculation step of calculating a similarity between the first and second images on the basis of an image feature amount obtained in the coefficient conversion step; and a program code of the determination step of determining a similarity between the first and second images from the similarities calculated in the first and second calculation steps.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail hereinafter with reference to the accompanying drawings.

Figure 1:
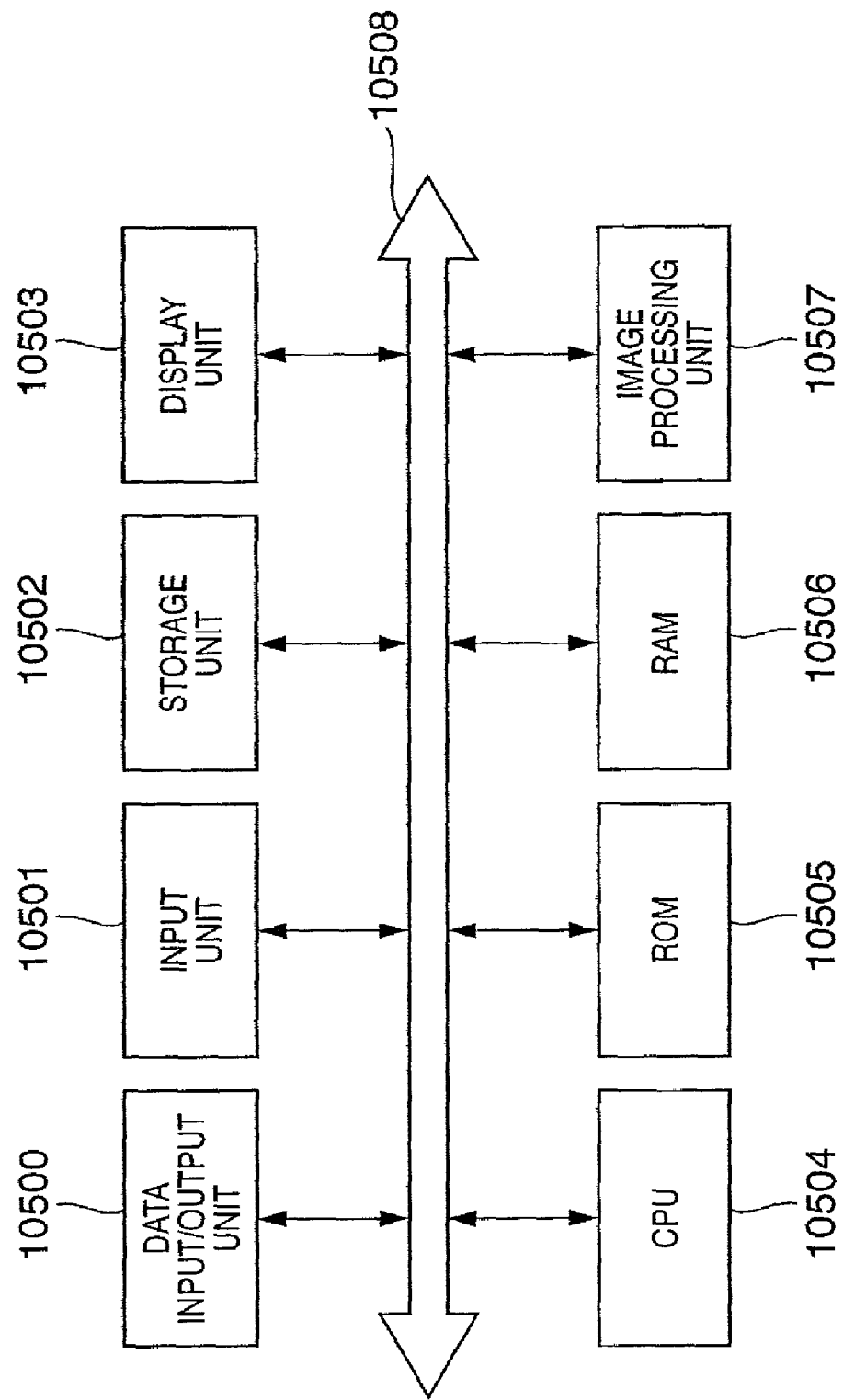
FIG. 1 is a block diagram showing the arrangement of an image processing apparatus according to an embodiment of the present invention.

FIG. 1 is a block diagram showing the arrangement of an image processing apparatus according to an embodiment of the present invention.

A data input/output unit 10500 is an image input device which can input/output both still and moving image data. For example, a digital video device which can take a still picture may be used. Also, image data may be loaded from an external storage device such as a memory card, PC card, or the like via a communication interface such as USB or the like. Furthermore, image data may be input from a storage device which uses a detachable storage medium, such as a CD-ROM drive, floppy disk drive, or the like.

In addition, image data may be input via a communication path of network connection or the like by a communication path controller such as an Ethernet card, modem, wireless communication, or the like. On the other hand, the data input/output unit 10500 writes image data in, e.g., a memory card.

An input unit 10501 is a device for inputting user's instructions and data, and includes a keyboard and pointing device. Note that a mouse, trackball, track pad, tablet, or the like may be used as the pointing device.

A storage unit 10502 is a device for storing image data and image feature amount data obtained by an image feature amount extraction process (to be described later), and a large-capacity storage medium such as a hard disk or the like is normally used. In addition, for example, optical/magnetooptical disks such as a CD-ROM, CD-R/RW, and the like may be used. Furthermore, a storage medium such as a memory card, PC card, or the like may be used. The storage unit 10502 and data input/output unit 10500 have been independently explained for the sake of simplicity, but they may be a single device in an actual apparatus.

A display unit 10503 is a device for displaying images for a GUI (graphical user interface) or the like, and normally uses a CRT, liquid crystal display, or the like.

A CPU 10504 controls the aforementioned building components. A ROM 10505 and RAM 10506 provide, to the CPU 10504, a control program, data, work area, and the like required for processes to be executed by the CPU 10504. A control program which implements an image feature extraction process shown in the flow chart to be described in each embodiment to be described later may be stored in either the storage unit 10502 or the ROM 10505. Especially, when the control program is stored in the ROM 10505, the program is executed after it is temporarily loaded onto the RAM 10506.

Reference numeral 10507 denotes an image processing unit which executes various image processes including an image similarity calculation process to be described in detail later.

A bus 10508 interconnects the aforementioned building components.

Note that each process of the flow chart described in each embodiment to be described later is implemented by the image processing unit 10507, which is controlled by the CPU 10504, but may be implemented by a dedicated program which implements the functions of the image processing unit 10507 (to be described later). Furthermore, all or some of processes may be implemented by an arbitrary combination of dedicated hardware and a dedicated program.

Prior to a description of an image similarity calculation process of this embodiment, the relationship between a general DCT coefficient transformation process and pixels of an original image will be explained.

In the following description, Color Layout descriptor in which the numbers of quantized DCT coefficients of the Y, Cb, and Cr components are x, y, and z will be abbreviated as x/y/z descriptor for the sake of simplicity.

Figure 14:
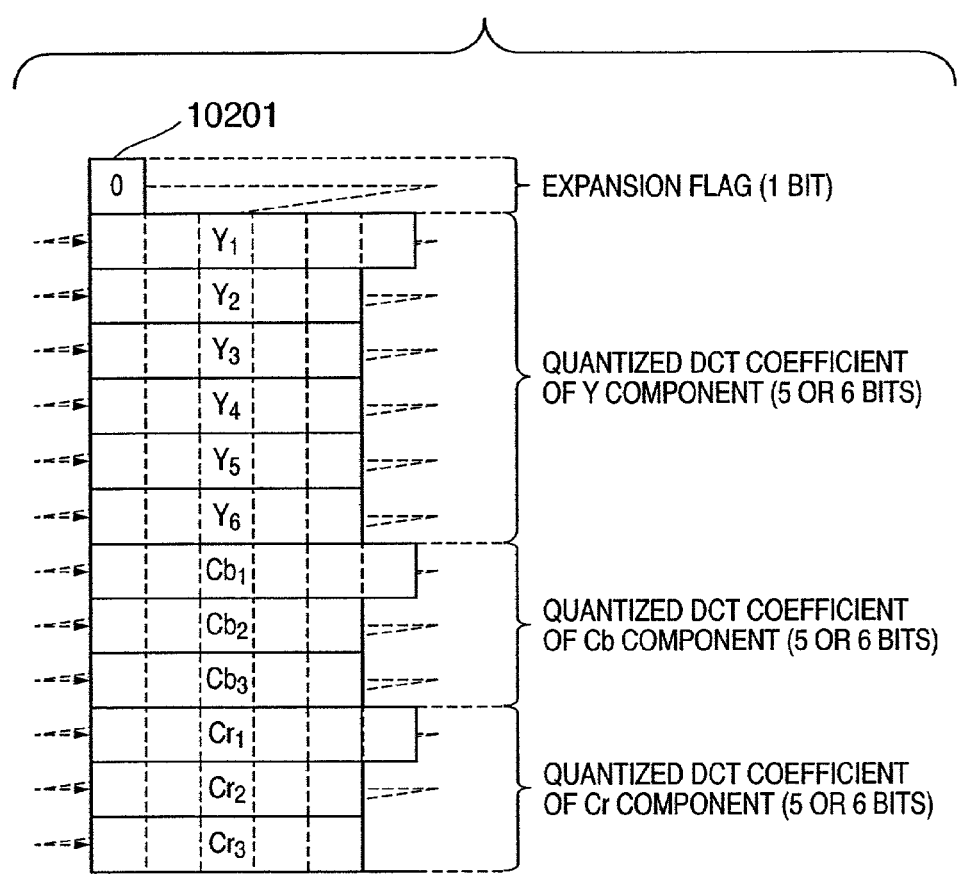
FIG. 14 shows the binary structure of Color Layout descriptor described in [VWD4.0] or [VXM7.0]
Figure 15:
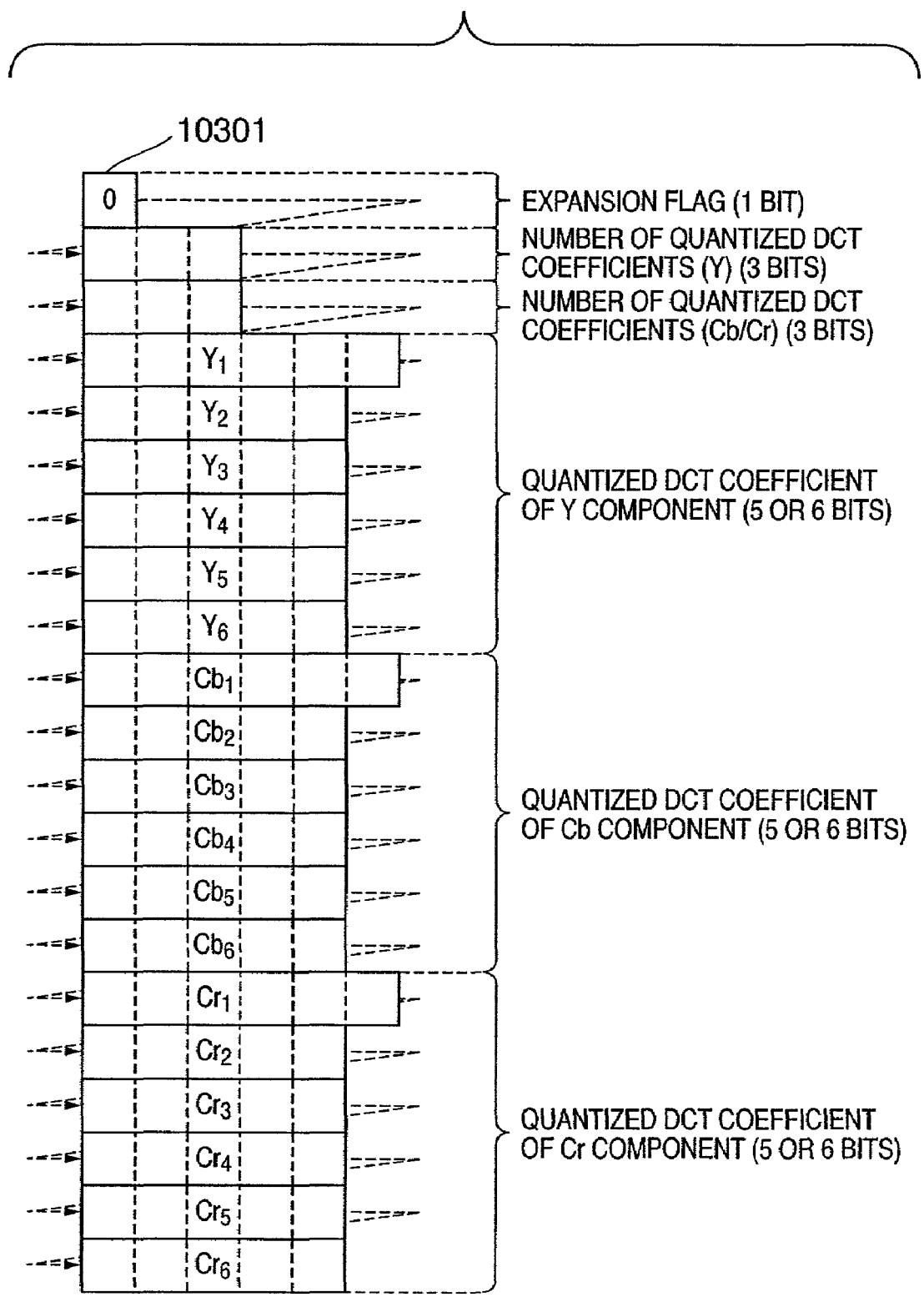
FIG. 15 shows the binary structure of Color Layout descriptor described in [VWD4.0] or [VXM7.0].

In this embodiment, a data example of a data storage method of Color Layout descriptor described in [VWD4.0] or [VXM7.0] explained above using FIG. 14 or 15 will be described. However, the present invention is not limited to such specific data, but can be applied to any other data storage methods as long as some quantized DCT coefficients are held and are used as an image feature amount.

Figure 2:
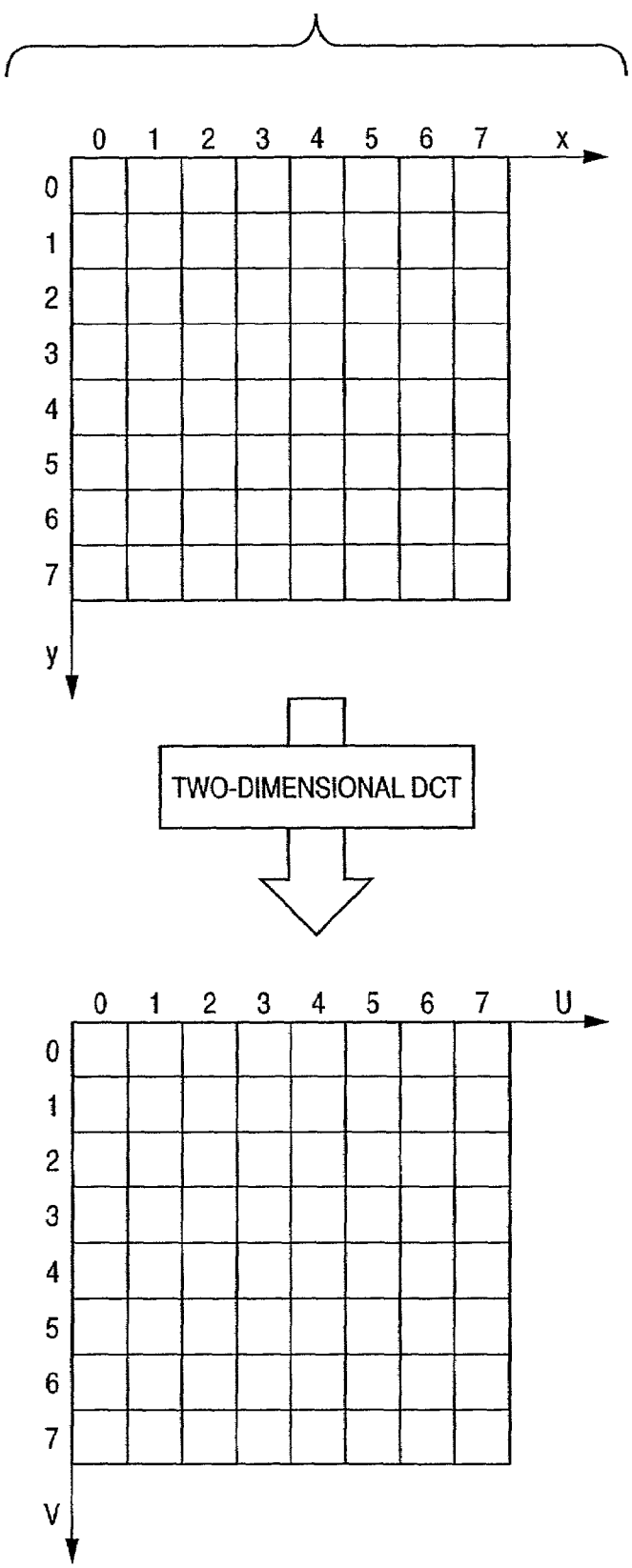
FIG. 2 is a view for explaining two-dimensional DCT in the embodiment of the present invention.

As shown in FIG. 2, DCT coefficients (F(U, V)) are obtained by computing the two-dimensional DCTs of an original image (f(x, y)) consisting of 8×8 pixels. U and V respectively correspond to changes in the x- and y-directions of the original image. The two-dimensional DCT process is described by:

$$F(U, V) = \frac{1}{4} C_U C_V \sum_{x=0}^{7} \sum_{y=0}^{7} f(x, y) \cos\frac{(2x+1)U\pi}{16} \cos\frac{(2y+1)V\pi}{16} \quad (1)$$

$$C_U, C_V = \begin{cases} \frac{1}{\sqrt{2}} & (U, V = 0) \\ 1 & (\text{else}) \end{cases}$$

Figure 3:
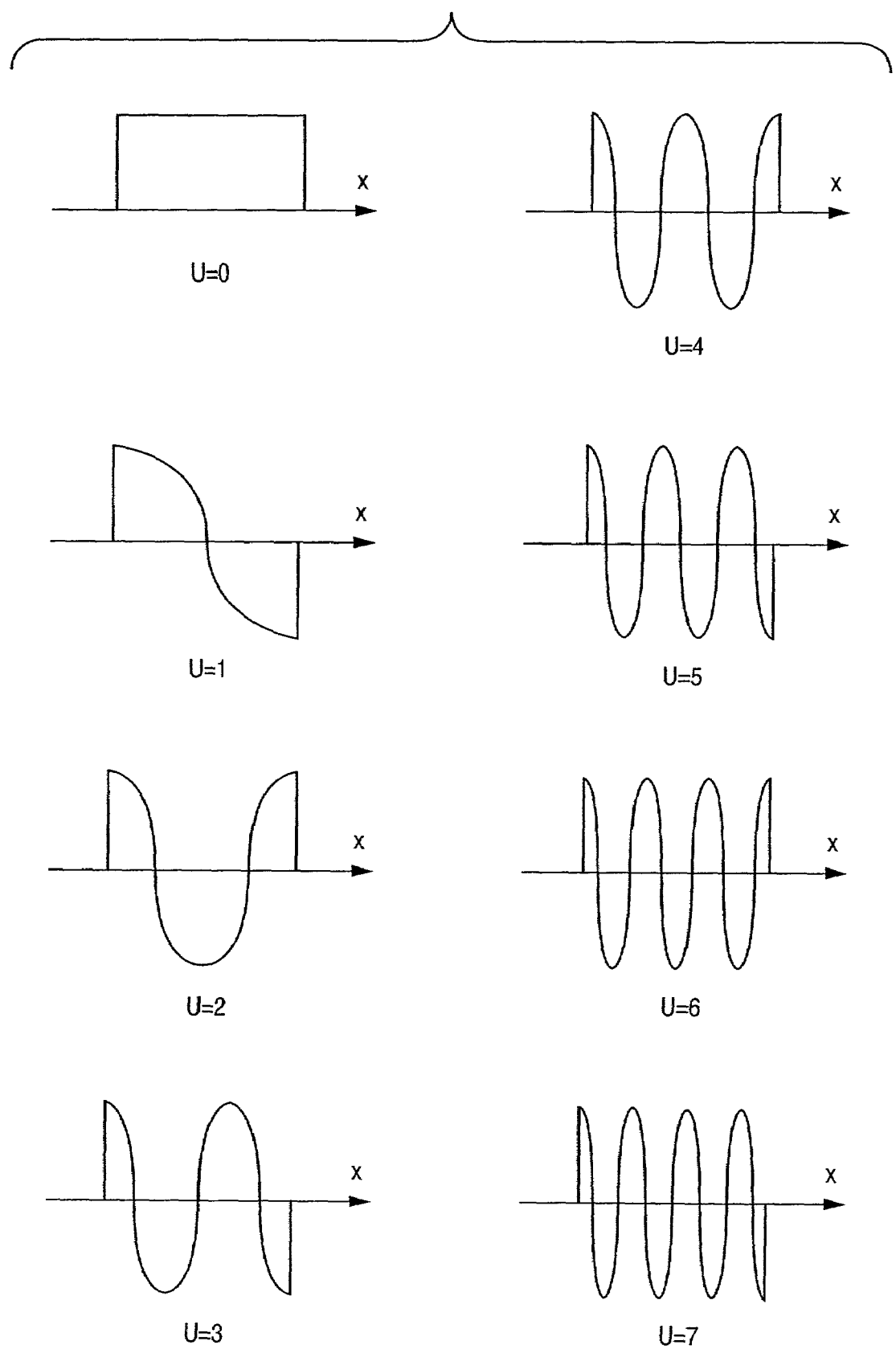
FIG. 3 shows the base waveforms of linear DCT in the embodiment of the present invention.

FIG. 3 shows the base waveforms of linear DCT of the embodiment of the present invention.

The respective waveforms shown in FIG. 3 correspond to views obtained by projecting eight base waveforms (U=0 to 7) onto a two-dimensional plane when V=0 in FIG. 2. The same applies to V, and a general DCT coefficient F(a, b) represents the magnitude of a spatial waveform component that is a two-dimensional synthesis of base waveforms U=a and V=b.

In FIG. 3, a base waveform when U is even is bilaterally symmetrical, and a base waveform when U is odd is symmetrical about a given point, i.e., overlaps an original waveform if it is rotated 180°. The same applies to V. That is, when V is even, the waveform is bilaterally symmetrical, and when V is odd, the waveform is symmetrical about a given point.

Figure 4:
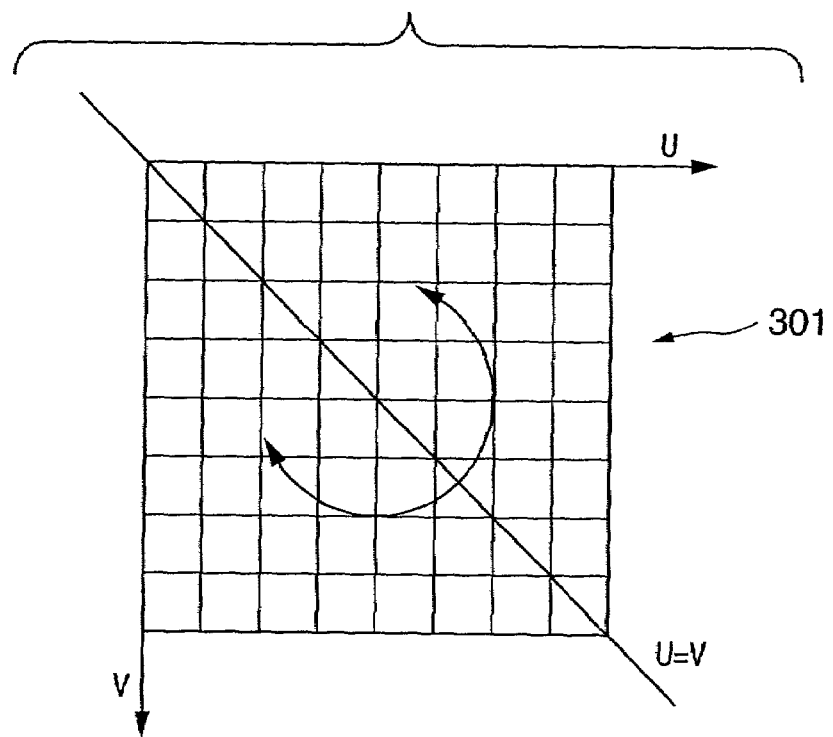
FIG. 4 is a view for explaining the relationship between a DCT coefficient replacement process and original image in the embodiment of the present invention.
Figure 4:
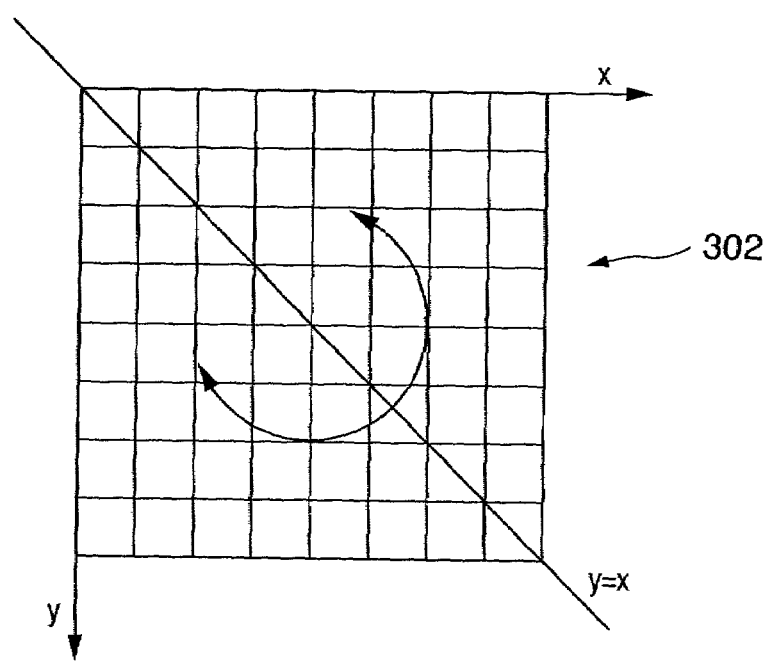

FIG. 4 is a view for explaining the relationship between a DCT coefficient replacement process and original image in the embodiment of the present invention.

When DCT coefficients are replaced to be axisymmetrical about U V, as shown in FIG. 4, an image obtained by computing the inverse DCTs of the replaced DCT coefficients matches an image obtained by replacing components of an original image 303 to be axisymmetrical about x=y. Since this image agrees with one which is obtained when the original image has undergone a counterclockwise 90° rotation process and then a mirror process in the vertical direction, the conversion process shown in FIG. 4 will be referred to as counterclockwise 90° rotation–vertical mirror conversion hereinafter.

Figure 5:
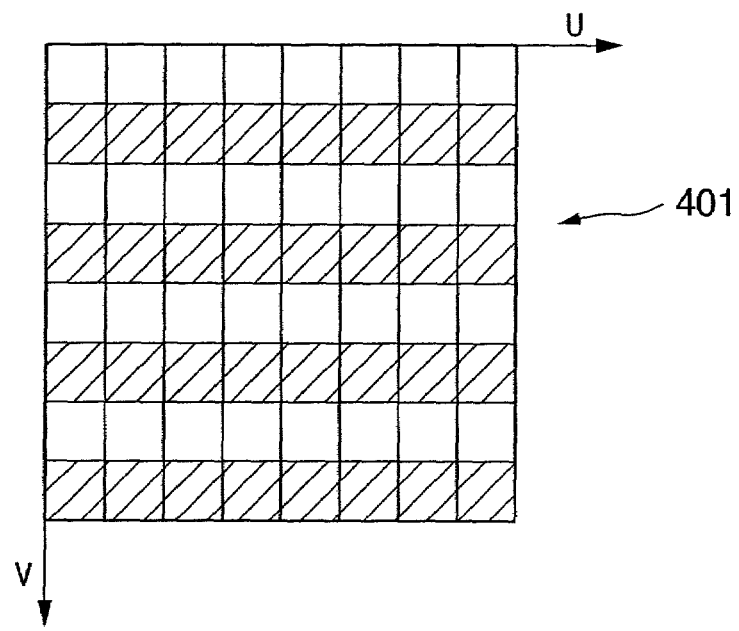
FIG. 5 is a view for explaining the relationship between a sign inversion process and original image when V is odd in DCT coefficients of the embodiment of the present invention.
Figure 5:
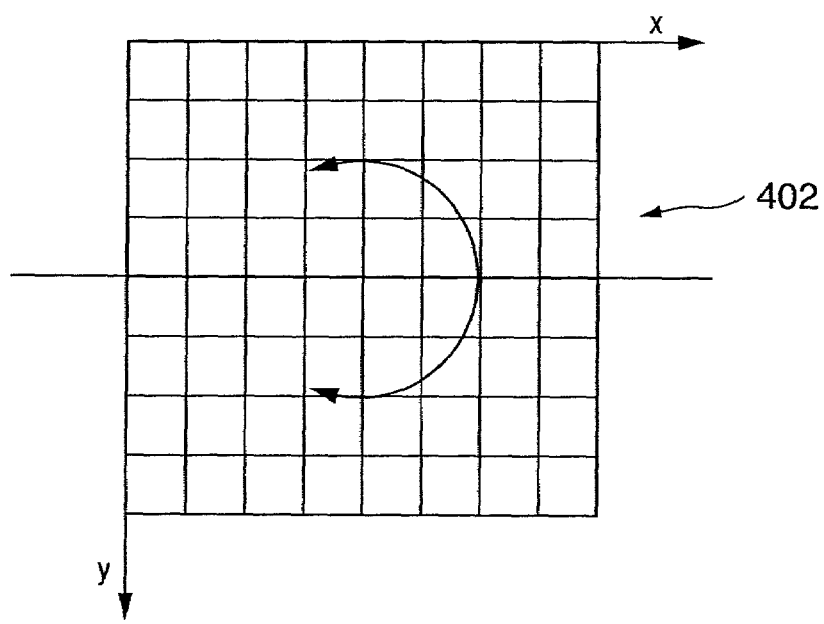

FIG. 5 is a view for explaining a sign inversion process and original image when V is odd in DCT coefficients in the embodiment of the present invention.

In FIG. 5, hatched DCT coefficients 401 correspond to V=odd. An image obtained by computing the inverse DCTs of the DCT coefficients in which the signs of the hatched DCT coefficients are inverted, matches an image obtained when an original image 402 has undergone a mirror process in the vertical direction. The conversion process shown in FIG. 5 will be referred to as vertical mirror conversion hereinafter.

Figure 6:
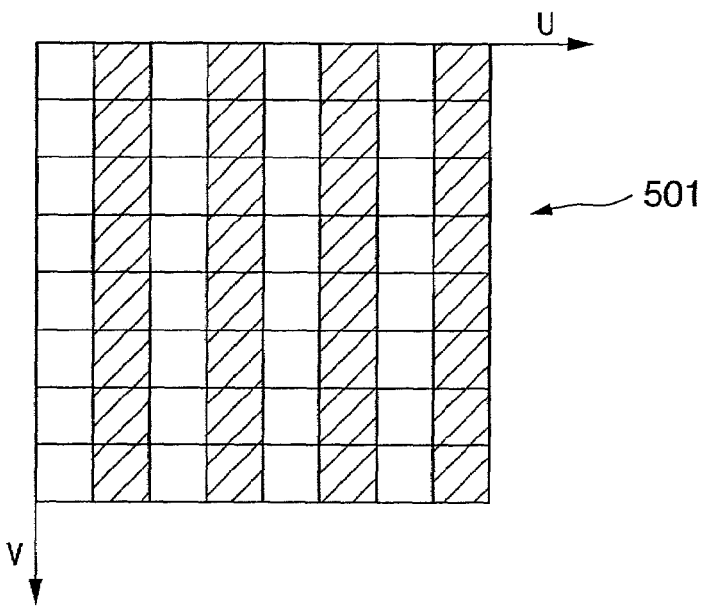
FIG. 6 is a view for explaining the relationship between a sign inversion process and original image when U is odd in DCT coefficients of the embodiment of the present invention.
Figure 6:
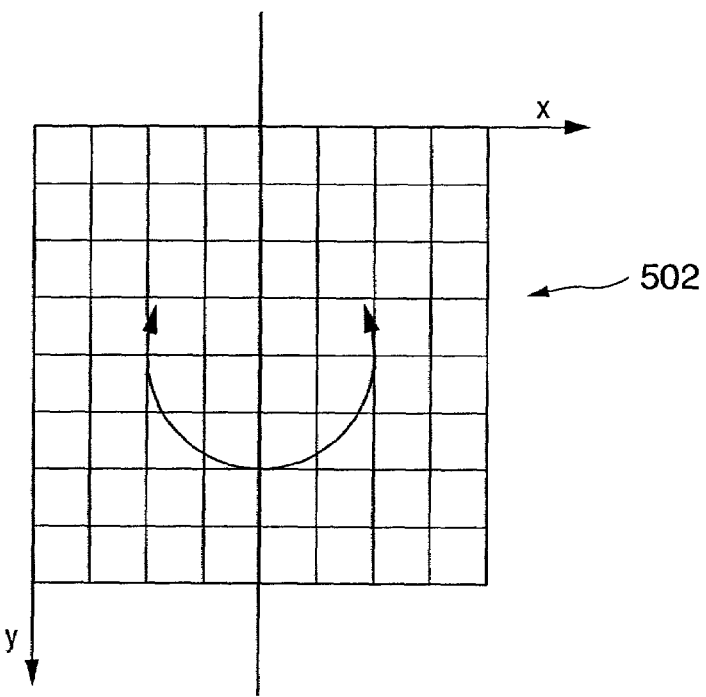

FIG. 6 is a view for explaining a sign inversion process and original image when U is odd in DCT coefficients in the embodiment of the present invention.

In FIG. 6, gray DCT coefficients 501 correspond to U=odd. An image obtained by computing the inverse DCTs of the DCT coefficients in which the signs of the hatched DCT coefficients are inverted, matches an image obtained when an original image 502 has undergone a mirror process in the horizontal direction. The conversion process shown in FIG. 6 will be referred to as horizontal mirror conversion hereinafter.

Figure 7:
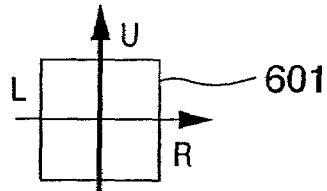
FIG. 7 shows an original image and a list of images after the original image has undergone rotation or mirror conversion.
Figure 7:
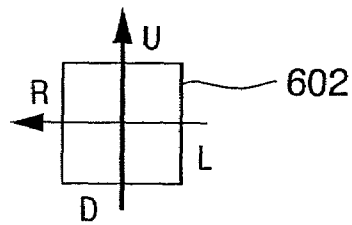
Figure 7:
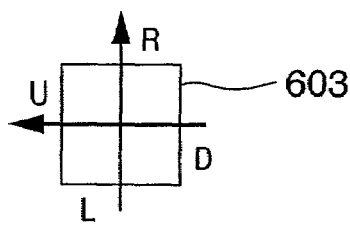
Figure 7:
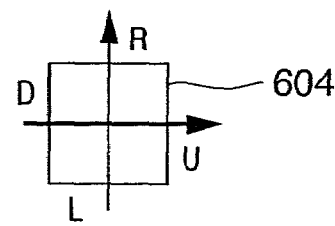
Figure 7:
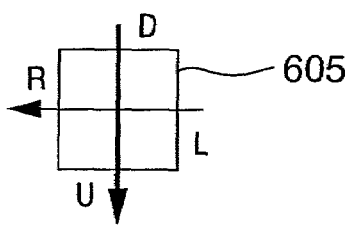
Figure 7:
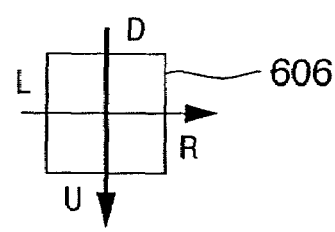
Figure 7:
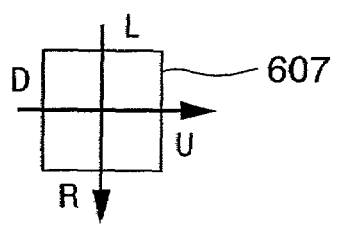
Figure 7:
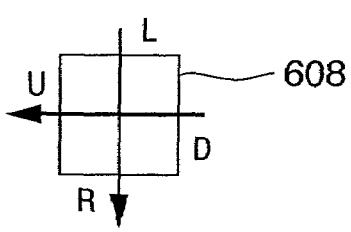

FIG. 7 shows an original image and a list of images after the original image has undergone rotation or mirror conversion in the embodiment of the present invention.

As described above, these conversion processes can be implemented on DCT coefficients by applying combinations of counterclockwise 90° rotation–vertical mirror conversion, vertical mirror conversion, and horizontal mirror conversion described using FIGS. 4 to 6 to the DCT coefficients. For example, DCT coefficients corresponding to 602 to 608 in FIG. 7 are realized by applying, to DCT coefficients of an original image, conversion processes according to conversion patterns:

602: horizontal mirror conversion

603: counterclockwise 90° rotation–vertical mirror conversion+vertical mirror conversion

604: counterclockwise 90° rotation–vertical mirror conversion+vertical mirror conversion+horizontal mirror conversion

605: vertical mirror conversion+horizontal mirror conversion

606: vertical mirror conversion

607: horizontal mirror conversion+counterclockwise 90° rotation–vertical mirror conversion

608: counterclockwise 90° rotation–vertical mirror conversion

These processing sequences are examples of sequences for obtaining DCT coefficients that represent 602 to 608, and demonstrate that DCT coefficients corresponding to 602 to 608 can be obtained by three processes shown in FIGS. 4 to 6. Therefore, DCT coefficients corresponding to 602 to 608 may be obtained by other combinations and processing orders.

Figure 13:
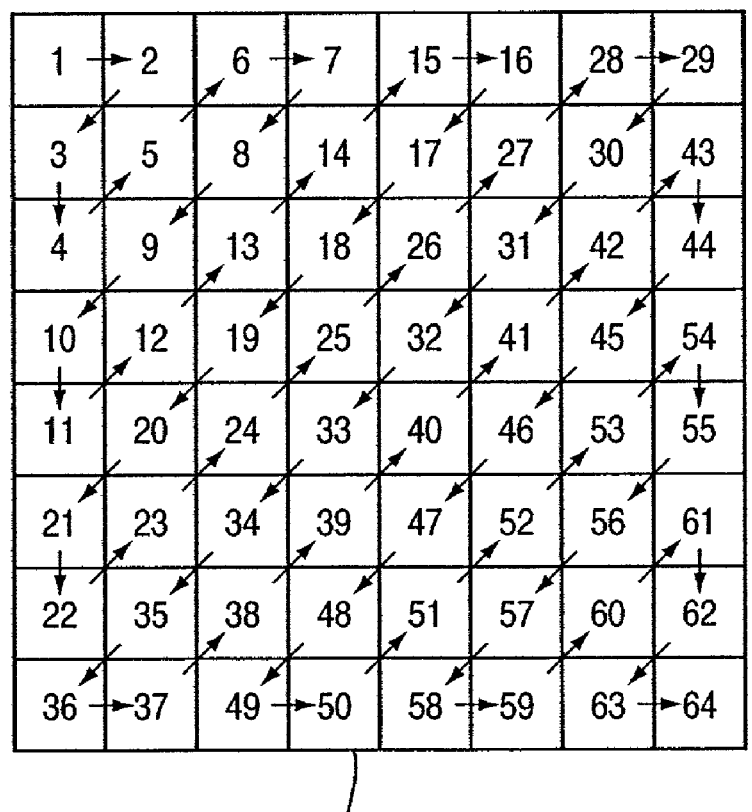
FIG. 13 is a view for explaining a zigzag scan process.

Note that Color Layout descriptor stores some quantized DCT coefficients selectively extracted from the low-frequency component side at the head of DCT coefficients, which are rearranged in a zigzag scan order shown in FIG. 13, as has been explained in the prior art. Hence, upon executing the coefficient conversion processes explained using FIGS. 4 to 6, all 64 quantized DCT coefficients do not always undergo the coefficient conversion process, but only those possessed by Color Layout descriptor undergo the process.

Figure 8:
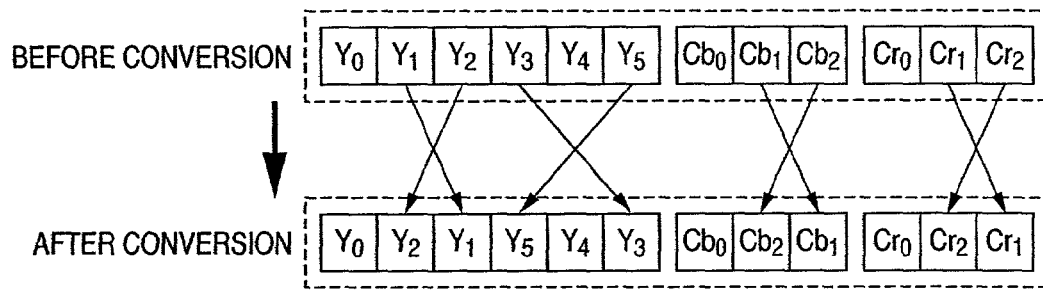
FIG. 8 shows an example of a coefficient conversion process in 6/3/3 descriptor of the embodiment of the present invention.
Figure 8:
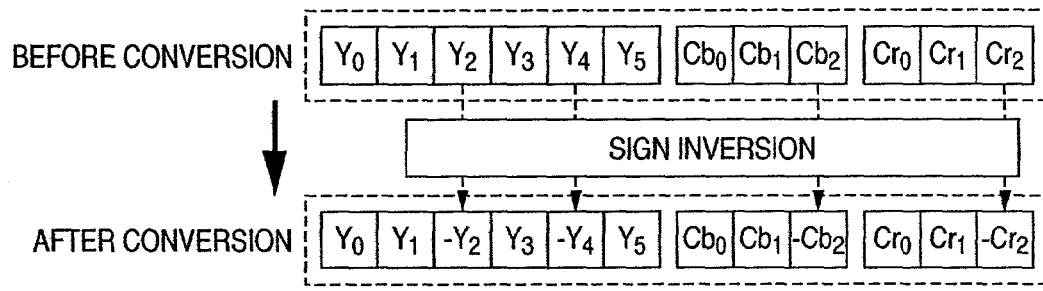
Figure 8:
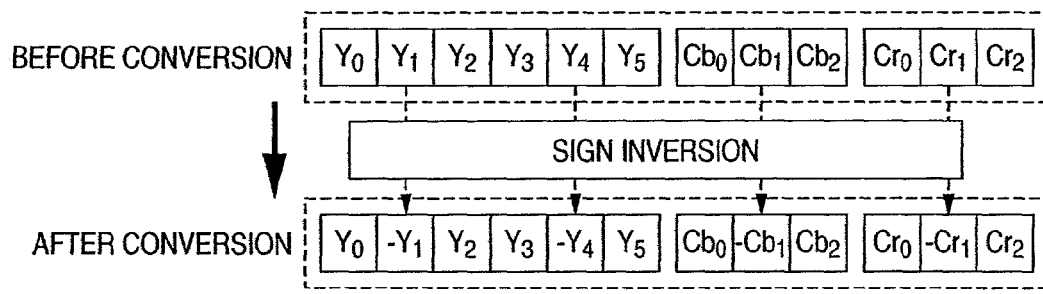

FIG. 8 shows examples of the coefficient conversion processes in 6/3/3 descriptor in the embodiment of the present invention.

As has been explained in the prior art, in Color Layout descriptor, the AC component of DCT is expressed by an unsigned 5-bit integer obtained by rounding and offsetting. Therefore, a sign inversion process for Color Layout descriptor uses an inversion form for 16 corresponding to the fact that a DCT coefficient before quantization is zero. That is, if an original quantized AC coefficient is a, an inverted value a' is obtained by:

$$a'=16-(a-16)=32-a \qquad (2)$$

If a=0, equation (2) yields a'=32. In such case, the value a' is, e.g., rounded to 31.

The detailed arrangement of the image processing unit 10507 will be described below using FIG. 9.

Figure 9:
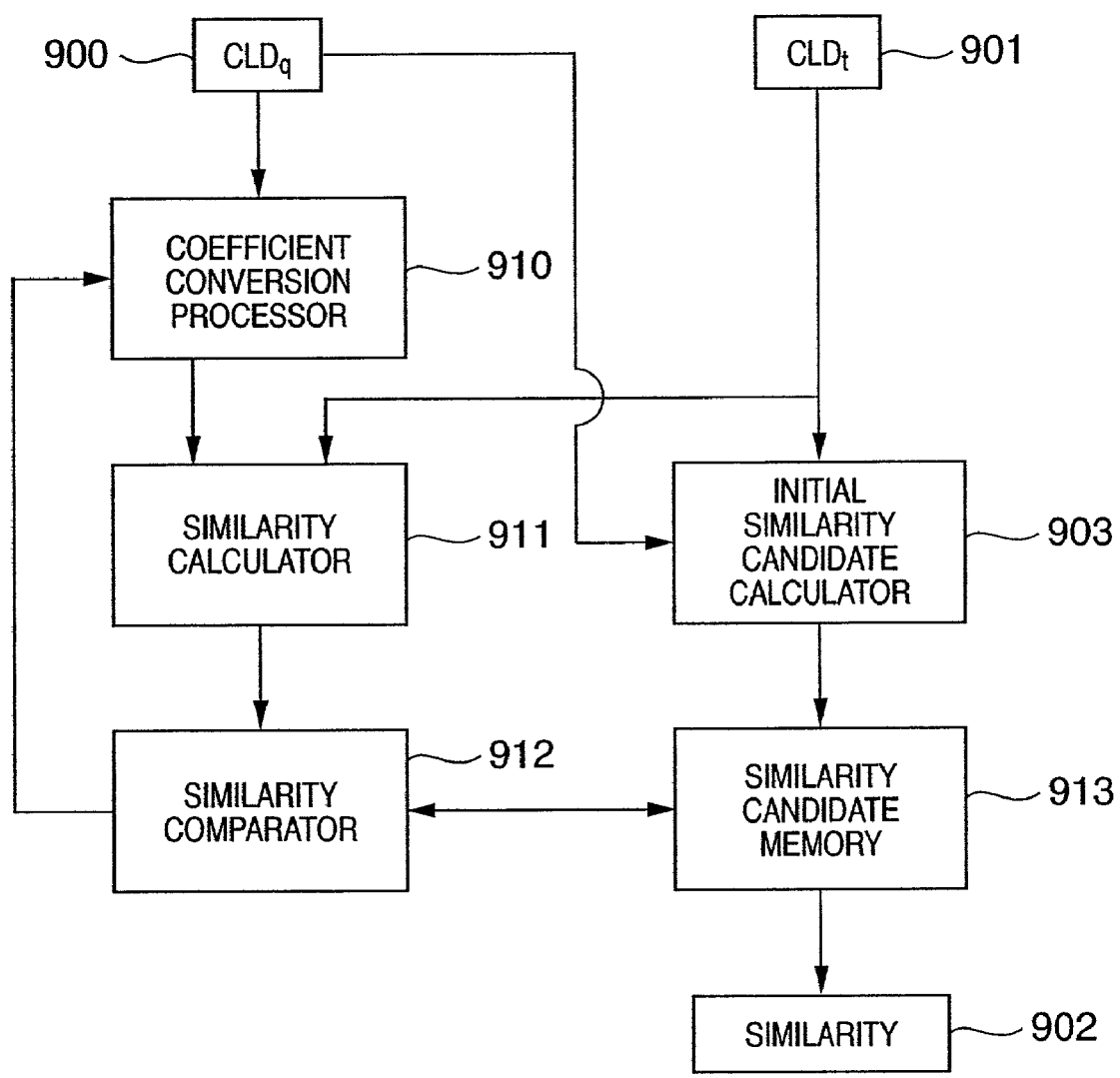
FIG. 9 is a block diagram showing the detailed arrangement of an image processing unit of the embodiment of the present invention.

FIG. 9 is a block diagram showing the detailed arrangement of an image processing unit of the embodiment of the present invention.

Referring to FIG. 9, reference numerals 900 and 901 denote two Color Layout descriptor data, CLDq and CLDt which are to undergo similarity calculation. In this embodiment, CLDq (900) alone is input to a coefficient conversion processor 910. Alternatively, both CLDq and CLDt (901) may be input to the coefficient conversion processor 910 to undergo the coefficient conversion process. In this case, the process may be implemented by a plurality of coefficient conversion processors.

The coefficient conversion processor 910 executes the conversion processes described in FIGS. 4 to 6 above for input CLDq (900). Note that the conversion processes include a non-conversion process.

An initial similarity candidate calculator 903 calculates a similarity between CLDq (900) and CLDt (901), and stores it as similarity candidate data between CLDq (900) and CLDt (901) in a similarity candidate memory 913. An arbitrary similarity calculation formula may be used in this similarity calculation, but the similarity calculation formula explained in the prior art is used in this embodiment.

A similarity calculator 911 calculates a similarity between the output from the coefficient conversion processor 910 and CLDt (901). A similarity calculation formula used in this similarity calculation is the same as that used in the initial similarity candidate calculator 903.

The similarity calculated by the similarity calculator 911 is compared with the similarity candidate data held in the similarity candidate memory 913 by a similarity comparator 912. The similarity comparator 912 selects a similarity value, which is determined to be more similar, from these two similarity values, and updates the similarity candidate data held in the similarity candidate memory 913 by the selected similarity value. Since this embodiment uses the similarity calculation formula described in the prior art, data with a smaller similarity value is held in the similarity candidate memory 913.

Note that the similarity candidate memory 913 holds, as the similarity candidate data, the similarity between CLDq (900) and CLDt(901), which is calculated using the similarity calculation formula explained in the prior art. However, at the beginning of the process, the memory 913 may be initialized to an appropriate value, a sufficiently large value, or the like. Since this embodiment uses the similarity calculation formula described in the prior art, a smaller numerical value as the calculation result of the similarity calculation formula is determined to be similar.

The process from the coefficient conversion processor 910 until the similarity candidate memory 913 stores similarity candidate data is repeated a necessary number of times. In each process, the coefficient conversion processor 910 executes a different conversion, i.e., a coefficient conversion process corresponding to a required one of the conversion patterns 601 to 608 shown in FIG. 7.

Finally, upon completion of the processes for all the conversion patterns, similarity candidate data held by the similarity candidate memory 913 is output as a final similarity 902 between CLDq (900) and CLDt (901), thus ending the processing.

Note that the aforementioned arrangement implements the coefficient conversion processes using respective conversion patterns when the coefficient conversion processor 910 repeats the coefficient conversion process according to each of these conversion patterns. However, the present invention is not limited to such specific arrangement. For example, a required number of coefficient conversion processors which respectively implement coefficient conversion processes using individual conversion patterns may be arranged, CLDq (900) may be input to these processors, and similarities based on DCT coefficients obtained by these coefficient conversion processors may be compared to select a most appropriate similarity. In this case, the similarity candidate memory 913 can be omitted.

The image similarity calculation process executed by the image processing unit 10507 of this embodiment will be described below using FIG. 10.

Figure 10:
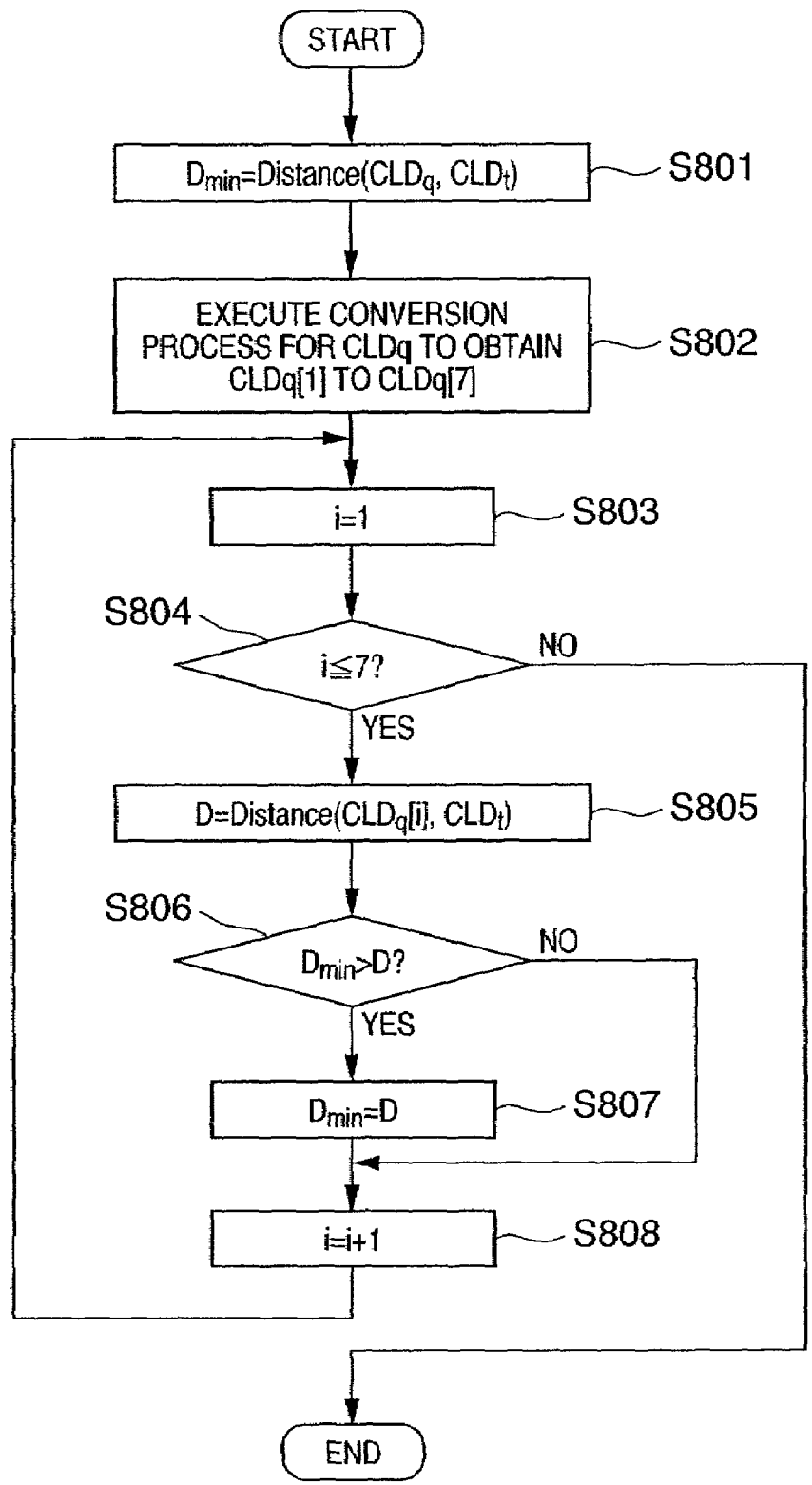
FIG. 10 is a flow chart showing an image similarity calculation process of the embodiment of the present invention.
Figure 11:
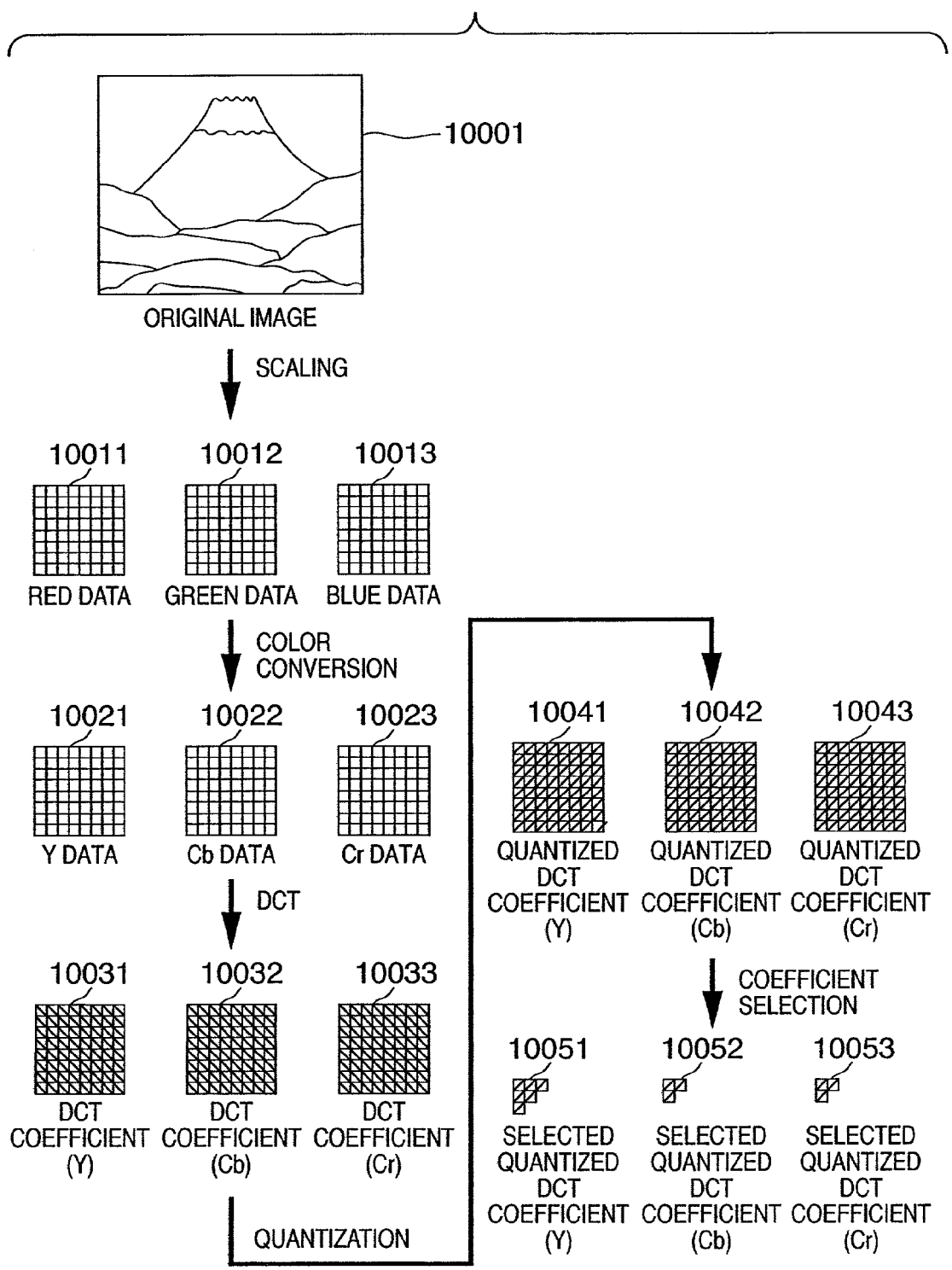
FIG. 11 is a view for explaining an image feature amount extraction process in "Color Layout descriptor" described in [VWD4.0] or [VXM7.0]
Figure 12:
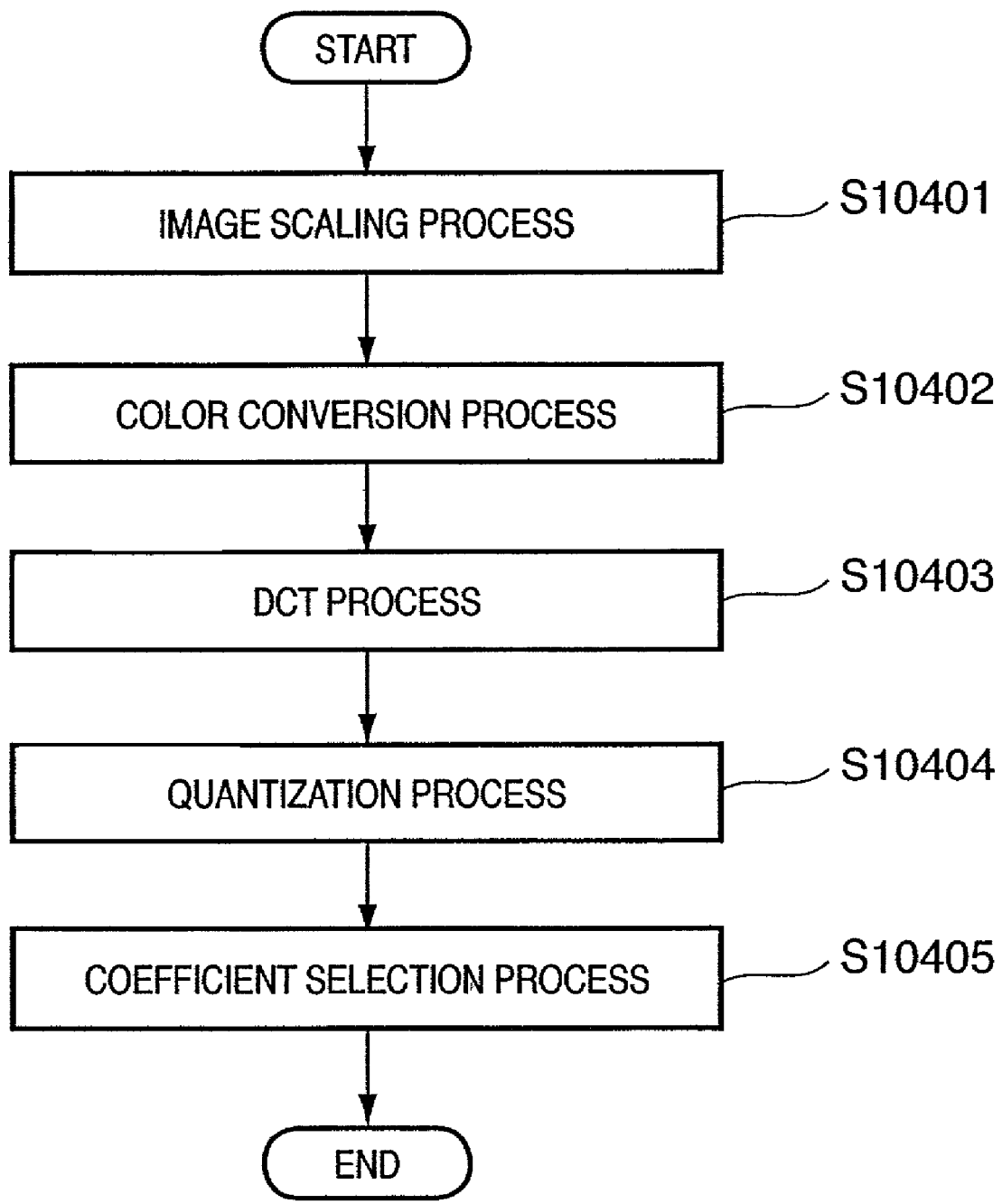
FIG. 12 is a flow chart showing the image feature amount extraction process according to [VWD4.0] or [VXM7.0]

FIG. 10 is a flow chart showing the image similarity calculation process in the embodiment of the present invention.

Note that this embodiment executes a similarity discrimination process between two Color Layout descriptors, CLDq and CLDt. Also, similarity discrimination is made for the original image and all the seven conversion patterns (602–608) shown in FIG. 7. However, for example, rotation alone may be made, and mirror conversion may be excepted from consideration to meet the requirements of a system to which the present invention is applied. In such case, four patterns including mirror conversion can be excluded from seven conversion patterns.

As described above, the image similarity calculation process is implemented by hardware in the image processing unit 10507, but all or some steps of the process may be implemented by software using a dedicated program.

In step S801, the initial similarity candidate calculator 903 calculates a similarity between CLDq and CLDt, and stores the similarity in the similarity candidate memory 913 by substituting it in a minimum similarity candidate Dmin (similarity candidate data) to initialize Dmin. Note that the similarity calculation in this unit uses the similarity calculation formula explained in the prior art, as described above. It is determined that a similarity value obtained by this similarity calculation formula has a higher degree of similarity as it assumes a positive value and is closer to zero.

In step S802, the coefficient conversion processor 910 executes conversion processes for CLDq to generate seven different conversion patterns CLDq[1] to CLDq[7] corresponding to the patterns 602 to 608 in FIG. 7. Note that the seven different patterns are generated based on the premise that the seven conversion patterns shown in FIG. 7 are used.

In step S803, the coefficient conversion processor 910 sets variable i=1 to initialize i used to control the repetitive processes of the subsequent steps S804 to S808.

In step S804, the coefficient conversion processor 910 executes an end checking process of the repetitive processes. More specifically, it is checked if variable i is equal to or smaller than 7. If variable i is larger than 7 (NO in step S804), the minimum similarity candidate Dmin stored in the similarity candidate memory 913 is output as a final similarity between CLDq[i] and CLDt, thus ending the processing. On the other hand, if variable i is equal to or smaller than 7 (YES in step S804), the flow advances to step S805.

In step S805, the similarity calculator 911 calculates a similarity D between CLDq[i] and CLDt. This similarity calculation uses the similarity calculation formula used in step S801.

In step S806, the similarity calculator 911 compares the minimum similarity candidate Dmin stored in the similarity candidate memory 913 and the calculated similarity D. More specifically, it is checked if Dmin is equal to or larger than D. If Dmin is a equal to or smaller than D (NO in step S806), the flow jumps to step S808. On the other hand, if Dmin is larger than D (YES in step S806), the flow advances to step S807 to update the minimum similarity candidate Dmin by the similarity D.

In step S808, the coefficient conversion processor 910 increments variable i by 1.

Note that the direction of the inequality sign in step S806 is set since a higher similarity is determined as the similarity value assumes a positive value and is closer to zero in the similarity calculation formula used. Hence, if it is determined that a higher similarity is determined as the value of the similarity calculation formula is larger, the direction of the inequality sign is reversed.

Also, in the similarity calculation formula used in this embodiment, a theoretical minimum value of a similarity is zero. Hence, in such case, a checking process for checking if the minimum similarity candidate Dmin as a similarity candidate calculated by the similarity candidate calculator 903 in steps S801 and S805 assumes a theoretical minimum value ("0" in this case) may be inserted after both steps S801 and S805. If the similarity candidate assumes the theoretical minimum value, all or part of the processes in steps S802 to S808 may be skipped; otherwise, the processes in step S802 and subsequent steps may be executed. In such case, especially when the calculated similarity has the theoretical minimum value, the processing efficiency can be improved.

Furthermore, in this embodiment, the processes are sequentially done using a loop upon comparison with the conversion patterns. However, these processes may be implemented by parallel processes.

As described above, according to this embodiment, similarities that take rotation and mirror conversion of an image into consideration are calculated, and are used in similarity discrimination between images. Therefore, images which become similar to each other if they are rotated or mirror-converted but cannot be determined as similar images by the conventional method, can be determined as similar images.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R/RW, DVD-ROM/RAM, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores a program code corresponding to the aforementioned flow chart.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for calculating a similarity between images, comprising:
    first calculation means for calculating a similarity between first and second images, which are expressed by quantized DCT coefficients, on the basis of at least first and second image feature amounts of the first and second images;
    coefficient conversion means for executing a coefficient conversion process for either the first image feature amount or the second image feature amount;

second calculation means for calculating a similarity between the first and second images on the basis of an image feature amount converted by said coefficient conversion means and the other image feature amount not converted by said coefficient conversion means; and determination means for determining a similarity between the first and second images on the basis of the similarities calculated by said first and second calculation means.

2. The apparatus according to claim 1, wherein the coefficient conversion process includes at least one of a symmetrical conversion process for quantized DCT coefficient included in the image feature amount about U=V when the quantized DCT coefficients are plotted on a U-V coordinate system, and a sign inversion conversion process for some of the quantized DCT coefficients.

3. The apparatus according to claim 1, wherein said determination means determines a similarity with a value closest to a predetermined value of the similarities calculated by said first and second calculation means as the similarity between the first and second images.

4. The apparatus according to claim 1, wherein the first and second images are images obtained by scaling corresponding first and second original images to images each consisting of 8×8 pixels.

5. An image processing method for calculating a similarity between images, comprising:

a first calculation step of calculating a similarity between first and second images, which are expressed by quantized DCT coefficients, on the basis of at least first and second image feature amounts of the first and second images;

a coefficient conversion step of executing a coefficient conversion process for either the first image feature amount or the second image feature amount;

a second calculation step of calculating a similarity between the first and second images on the basis of an image feature amount converted in the coefficient conversion step and the other image feature amount not converted in said coefficient conversion step; and a determination step of determining a similarity between the first and second images on the basis of the similarities calculated in the first and second calculation steps.

6. The method according to claim 5, wherein the coefficient conversion process includes at least one of a symmetrical conversion process for quantized DCT coefficient included in the image feature amount about U=V when the quantized DCT coefficients are plotted on a U-V coordinate system, and a sign inversion conversion process for some of the quantized DCT coefficients.

7. The method according to claim 5, wherein the determination step includes the step of determining a similarity with a value closest to a predetermined value of the similarities calculated in the first and second calculation steps as the similarity between the first and second images.

8. The method according to claim 5, wherein the first and second images are images obtained by scaling corresponding first and second original images to images each consisting of 8×8 pixels.

9. A program stored on a computer-readable medium for making a computer function as an image process for calculating a similarity between images, comprising:

a program code of the first calculation step of calculating a similarity between first and second images, which are expressed by quantized DCT coefficients, on the basis of at least first and second image feature amounts of the first and second images;

a program code of the coefficient conversion step of executing a coefficient conversion process for either the first image feature amount or the second image feature amount;

a program code of the second calculation step of calculating a similarity between the first and second images on the basis of an image feature amount converted in the coefficient conversion step and the other image feature amount not converted in said coefficient conversion step; and a program code of the determination step of determining a similarity between the first and second images on the basis of the similarities calculated in the first and second calculation steps.

10. An image processing apparatus for calculating a similarity between images, comprising:

first calculation means for calculating a similarity between first and second images, which are expressed by quantized DCT coefficients, on the basis of at least first and second image feature amounts of the first and second images;

coefficient conversion means for executing a coefficient conversion process for the first and second image feature amounts;

second calculation means for calculating a similarity between the first and second images on the basis of an image feature amount obtained by said coefficient conversion means; and determination means for determining a similarity between the first and second images the similarities calculated by said first and second calculation means, wherein the coefficient conversion process includes at least one of a symmetrical conversion process for quantized DCT coefficient included in the image feature amount about U=V when the quantized DCT coefficients are plotted on a U-V coordinate system, and a sign inversion conversion process for some of the quantized DCT coefficients.

11. An image processing method for calculating a similarity between images, comprising:

a first calculation step of calculating a similarity between first and second images, which are expressed by quantized DCT coefficients, on the basis of at least first and second image feature amounts of the first and second images;

coefficient conversion means for executing a coefficient conversion process for the first and second image feature amounts;

a second calculation step of calculating a similarity between the first and second images on the basis of an image feature amount obtained by said coefficient conversion means; and a determination step of determining a similarity between the first and second images the similarities calculated by said first and second calculation means, wherein the coefficient conversion process includes at least one of a symmetrical conversion process for quantized DCT coefficient included in the image feature amount about U=V when the quantized DCT coefficients are plotted on a U-V coordinate system, and a sign inversion conversion process for some of the quantized DCT coefficients.

* * * * *

UNITED STATES PATENT AND TRADEMARK OFFICE
CERTIFICATE OF CORRECTION

PATENT NO. : 7,079,689 B2  Page 1 of 1
APPLICATION NO. : 10/176031
DATED : July 18, 2006
INVENTOR(S) : Yasuo Fukuda It is certified that error appears in the above-identified patent and that said Letters Patent is hereby corrected as shown below:

COLUMN 8:
Line 19, " U V," should read -- U=V, --.

COLUMN 14:
Lines 33 and 57, "images" should read -- images from --.

Signed and Sealed this

Twenty-seventh Day of March, 2007

JON W. DUDAS
*Director of the United States Patent and Trademark Office*